(12) United States Patent
Han et al.

(10) Patent No.: US 9,799,857 B2
(45) Date of Patent: Oct. 24, 2017

(54) SECONDARY BATTERY HAVING CURVED POUCH

(71) Applicant: SAMSUNG SDI CO., LTD., Yongin-si, Gyeonggi-do (KR)

(72) Inventors: Junhee Han, Yongin-si (KR); In-Seop Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/695,953

(22) Filed: Apr. 24, 2015

(65) Prior Publication Data
US 2016/0043354 A1 Feb. 11, 2016

(30) Foreign Application Priority Data
Aug. 11, 2014 (KR) ........................ 10-2014-0103632

(51) Int. Cl.
*H01M 2/02* (2006.01)
(52) U.S. Cl.
CPC ....... *H01M 2/0202* (2013.01); *H01M 2/0212* (2013.01); *H01M 2002/0205* (2013.01); *H01M 2220/30* (2013.01)
(58) Field of Classification Search
None
See application file for complete search history.

(56) References Cited

U.S. PATENT DOCUMENTS

| 6,319,630 | B1 * | 11/2001 | Hasegawa | H01M 2/0202 429/124 |
| 2004/0048149 | A1 * | 3/2004 | Gross | H01M 2/0267 429/127 |
| 2011/0274955 | A1 | 11/2011 | Park et al. | |
| 2013/0108907 | A1 * | 5/2013 | Bhardwaj | H01M 10/0431 429/94 |

FOREIGN PATENT DOCUMENTS

| JP | 2003123706 A | * | 4/2003 |
| KR | 10-2007-0056426 A | | 6/2007 |
| KR | 10-2011-0105737 A | | 9/2011 |
| KR | 10-2011-0107448 A | | 10/2011 |

OTHER PUBLICATIONS

English translation of JP 2003123706 A—2003.*

* cited by examiner

*Primary Examiner* — Lucas J. O'Donnell
(74) *Attorney, Agent, or Firm* — Lewis Roca Rothgerber Christie LLP (57) ABSTRACT

A secondary battery includes an electrode assembly; a first pouch including an internal space accommodating the electrode assembly; and a second pouch coupled to at least one part of the first pouch and thermally bonded to at least one part of the first pouch, the first pouch and the second pouch sealing the electrode assembly. The first pouch and the second pouch each includes a body portion contacting the electrode assembly, the body portion comprising a back side, a front side opposite the back side, and two side surfaces between the back side and the front side; and a pair of wing (Continued)

portions respectively protruding from the two side surfaces of the body portion. A width of each of the pair of wing portions varies along the longitudinal direction of the electrode assembly such that the width of a central part of each of the pair of wing portions is greater than the width of either end part of each of the pair of wing portions.

10 Claims, 4 Drawing Sheets

SECONDARY BATTERY HAVING CURVED POUCH

CROSS-REFERENCE TO RELATED APPLICATION

This application claims priority to and the benefit of Korean Patent Application No. 10-2014-0103632, filed on Aug. 11, 2014, in the Korean Intellectual Property Office, the entire content of which is incorporated herein by reference.

BACKGROUND

1. Field

One or more aspects of embodiments of the present invention relate to secondary batteries.

2. Description of the Related Art

Secondary batteries are rechargeable, and thus are economical and environmentally friendly. As such, secondary batteries are used in a variety of electronic devices, and the design of such electronic devices plays a role in their utility.

For example, various wearable computer devices that use secondary battery as a power source, as well as ergonomic cell phones and laptop computers, include curved areas. Accordingly, secondary batteries included in such electronic devices need to have curved areas to match the curved areas of the electronic devices.

SUMMARY

One or more aspects of embodiments of the present invention are directed toward secondary batteries.

Additional aspects will be set forth in part in the description which follows and, in part, will be apparent from the description.

According to one embodiment of the present invention, a secondary battery includes:

an electrode assembly;

a first pouch including an internal space accommodating the electrode assembly; and a second pouch coupled to a first part of the first pouch and thermally bonded to a second part of the first pouch to seal the electrode assembly, wherein each of the first pouch and the second pouch includes:

a body portion contacting the electrode assembly, the body portion including a back side, a front side opposite the back side, and two side surfaces between the back side and the front side; and a pair of wing portions respectively extending from the two side surfaces of the body portion, wherein a width of each of the pair of wing portions varies along a longitudinal direction of the electrode assembly.

In one embodiment, the width of a central part of each of the pair of wing portions may be greater than the width of either end part of each of the pair of wing portions.

In one embodiment, the width of each of the pair of wing portions may gradually decrease from the central part of the wing portion to either end of the wing portion.

In one embodiment, a rim of each of the pair of wing portions may be curved.

In one embodiment, each of the pair of wing portions may be symmetric with respect to a centre of the wing portion.

According to one embodiment of the present invention, a secondary battery includes:

an electrode assembly including a first electrode tab and a second electrode tab; and a curved pouch accommodating the electrode assembly, wherein the curved pouch includes:

a body portion accommodating the electrode assembly, the body portion including a back side, a front side opposite the back side, and two side surfaces between the back side and the front side;

a pair of wing portions respectively extending from the two side surfaces of the body portion and bent toward the side of the body portion, a rim of each of the pair of wing portions being curved; and a terrace portion extending from the front side of the body portion, the terrace portion, the pair of wing portions and the back side of the body portion together enclosing an internal space of the body portion, wherein the first electrode tab and the second electrode tab extend to the outside of the curved pouch.

In one embodiment, a width of a central part of each of the pair of wing portions may be greater than a width of either end part of each of the pair of wing portions.

In one embodiment, the width of each of the pair of wing portions may gradually decrease from the central part of the wing portion to either end of the wing portion.

In one embodiment, each of the pair of wing portions may be symmetric with respect to a centre of the wing portion.

In one embodiment, each of the pair of wing portions may be bent perpendicular to the terrace portion and may include an extension portion continuously extending from the wing portion to the terrace portion.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. However, the present embodiments may have different forms and should not be construed as being limited to the descriptions set forth herein; rather, these embodiments are provided so that this disclosure will be thorough and complete, and will fully convey the concept of the invention to those skilled in the art. Accordingly, the embodiments are merely described below, by referring to the figures, to explain aspects of the present description. The use of any language provided herein, is intended merely to better illuminate the examples and does not pose a limitation on the scope of the invention. As used herein, the term "and/or" includes any and all combinations of one or more of the associated listed items. As used herein, the singular forms "a," "an" and "the" are intended to include the plural forms as well, unless the context clearly indicates otherwise. It will be further understood that the terms "comprises" and/or "comprising" used herein specify the presence of stated components, operations, and/or device, but do not preclude the presence or addition of one or more other components, operations, and/or device. While terms such as "first", "second", etc., may be used to describe various components, such components are not limited by the above terms. The above terms are used only to distinguish one component from another. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

Figure 1:
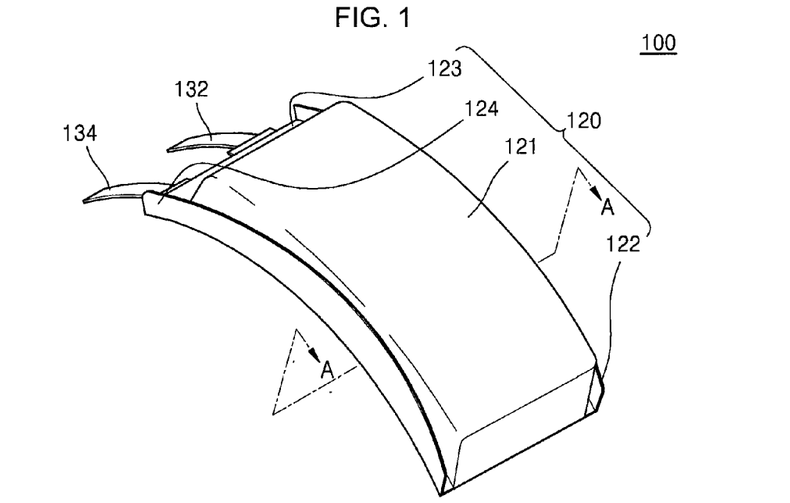
FIG. 1 is a schematic perspective view of a secondary battery according to an embodiment of the present invention.
Figure 2:
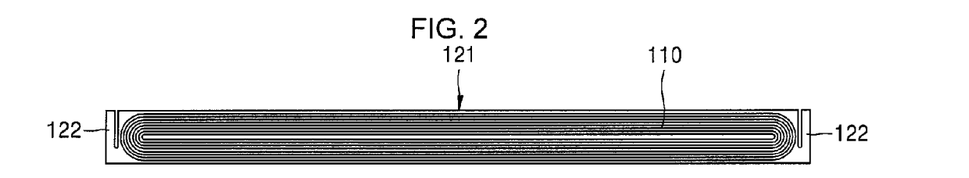
FIG. 2 is a schematic cross-sectional view taken along line A-A of the secondary battery in FIG. 1.
Figure 3:
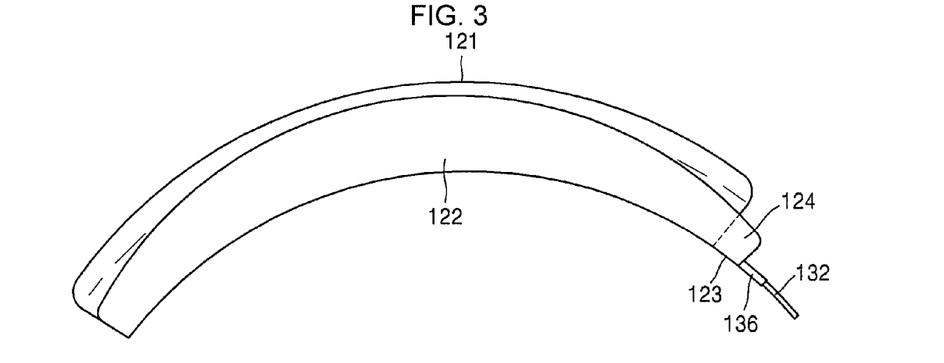
FIG. 3 is a schematic side view of the secondary battery in FIG. 1.
Figure 4:
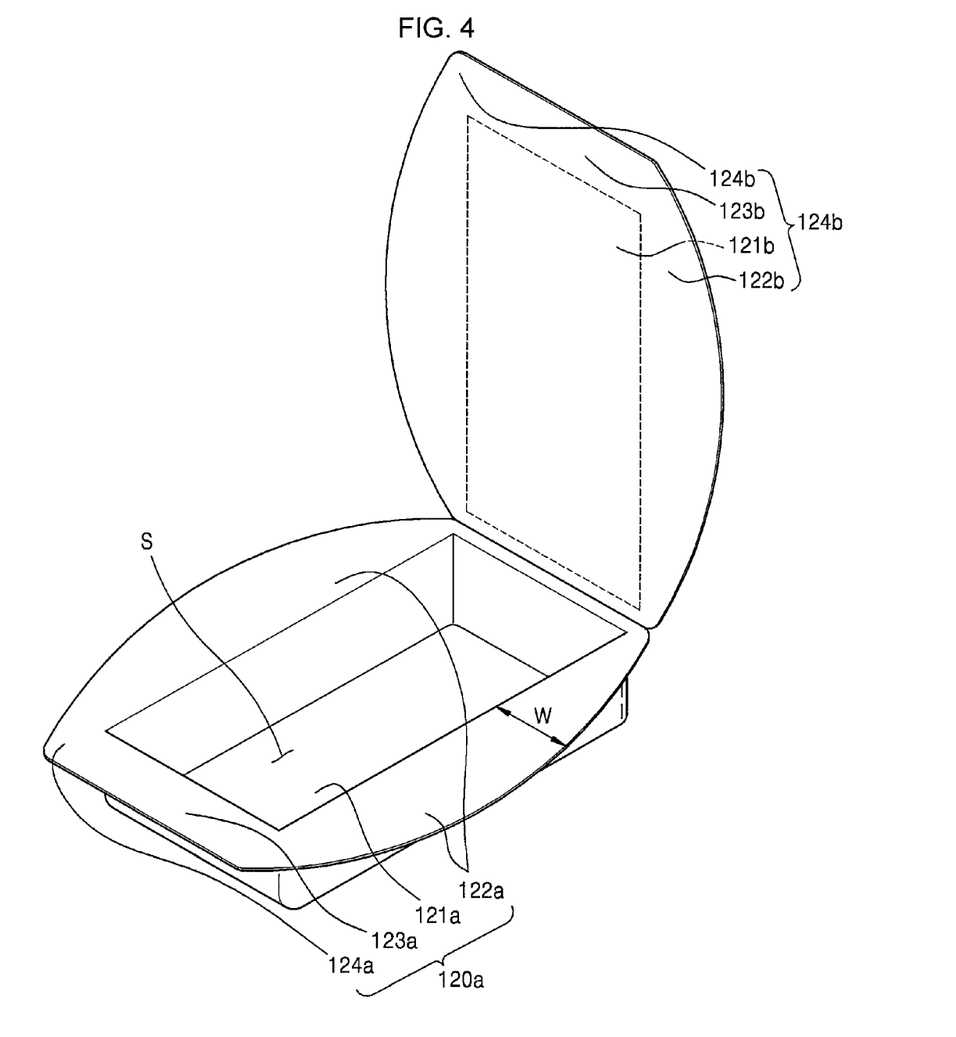
FIG. 4 is a schematic perspective view of a pouch in FIG. 1.

FIG. 1 is a schematic perspective view of a secondary battery according to an embodiment of the present invention. FIG. 2 is a schematic cross-sectional view of the secondary battery of FIG. 1 taken along line A-A of FIG. 1. FIG. 3 is a schematic side view of the secondary battery in FIG. 1. FIG. 4 is a schematic perspective view of a pouch in FIG. 1.

Referring to FIGS. 1 to 4, the secondary battery 100 may include an electrode assembly 110 and a pouch 120 configured to accommodate and seal the electrode assembly 110.

The electrode assembly 110 may, for example, include a positive electrode plate coated with a positive active material, a negative electrode plate coated with a negative active material, and a separator between the positive electrode plate and the negative electrode plate. In one embodiment, the positive electrode plate and the negative electrode plate are positioned on top of one another (e.g., laminated on top of one another) and then rolled into a jelly-roll shape. In one embodiment, the electrode assembly 110 may include multiple combinations of the positive electrode plate, the separator, and the negative electrode plate sequentially laminated on top of one another.

The pouch 120 may include a body portion 121 sealing the electrode assembly 110, a pair of wing portions 122, and a terrace portion 123, that are coupled to each other (e.g., by melting adhesion).

In one embodiment, the pouch 120 may include a first pouch 120a, in which a receiving space S is formed, and a second pouch 120b that is configured to be coupled to the first pouch 120a (e.g., by thermal bonding), so as to close the internal space of the battery. In one embodiment, the first pouch 120a and the second pouch 120b may be identical or similar to each other. For example, the first pouch 120a and the second pouch 120b may each have a first insulating layer, a metal layer, and a second insulating layer sequentially laminated on top of one another. In one embodiment, the first insulating layer and the second insulating layer may each be formed of polypropylene (PP), polyethylene terephthalate (PET), or nylon. The metal layer may be formed of aluminum, steel, or stainless steel. The pouch 120 may be formed in various ways. In one embodiment, the pouch 120 may have a triple-layer structure including a first insulating layer formed of PP, a metal layer formed of aluminum, and a second insulating layer formed of PET.

The first pouch 120a may include a first body portion 121a including a receiving space S configured to accommodate an electrode assembly 110. The first body portion 121a may include a back side, a front side opposite the back side, and two side surfaces between the back side and the front side. The first pouch 120a may further include a pair of first wing portions 122a respectively protruding from the two side surfaces of the first body portion 121a, and a first terrace portion 123a protruding from the front side of the first body portion 121a.

The pair of first wing portions 122a may be respectively positioned on either side surface of the first body portion 121a. In one embodiment, a width W of each of the pair of first wing portions 122a may vary along the longitudinal direction of the electrode assembly 110. For example, the width W of a central part of each of the pair of first wing portions 122a may be greater than the width W of either end part of each of the pair of first wing portions 122a. The width W of each of the pair of first wing portions 122a may gradually decrease from the central part of the first wing portion 122a to either end of the first wing portion 122a. In one embodiment, the width W of each of the pair of first wing portions 122a may be measured in a direction perpendicular to a longitudinal direction of the first wing portion 122a. Specifically, the width W of each of the pair of first wing portions 122a may be the length of a straight line extending from an outer end of the receiving space S of the first body portion 121a to an outer end of the first wing portion 122a.

Each of the pair of first wing portions 122a may be curved (e.g. may be in a streamlined form). In other words, the rim of each of the pair of first wing portions 122a may be curved or round. In one embodiment, the rim of each of the pair of first wing portions 122a may be identical or similar in shape to a part of an ellipse, a part of a circle, a part of sine curve, or a part of cosine curve. In one embodiment, the receiving space S of the first body portion 121a may be rectangular, and the width W of each of the pair of first wing portions 122a (measured from the outer end of the receiving space S to the outer end (or rim) of the first wing portion 122a) may vary along the longitudinal direction of the first wing portion 122a.

The pair of first wing portions 122a may be respectively formed on the two side surfaces of the first body portion 121a. In one embodiment, each of the pair of first wing portions 122a may extend to the first terrace portion 123a. In embodiment where the pair of first wing portions 122a are folded along the outer upper edge of the receiving space S toward the sides of the electrode assembly (as described below), each of the pair of first wing portions 122a may respectively include a pair of first extension portions 124a positioned perpendicular to the first terrace portion 123a.

In one embodiment, each of the pair of first wing portions 122a may be formed continuously with its respective first extension portion 124a, and when each first wing portion 122a along with the first extension portion 124a is bent along the outer upper edge of the receiving space S toward the sides of the electrode assembly, each first wing portion 122a along with the first extension portion 124a may be perpendicular to the terrace portion 123a. In one embodiment, the edge (or rim) of each first extension portion 124a may be curved (or round or inclined) along the longitudinal direction of the first extension portion 124a.

The first terrace portion 123a may protrude from the front side of the first body portion 121a. In one embodiment, the first terrace portion 123a and a second terrace portion 123b (described below) may bond (or may be coupled) to each other so as to form a terrace portion 123.

A second pouch 120b may be similar to the first pouch 120a. In one embodiment, the second pouch 120b may include a second body portion 121b configured to contact the electrode assembly 110 and including a back side, a front side opposite the back side, and two side surfaces between the back side and the front side. The second pouch 120b may further include a pair of second wing portions 122b respectively protruding from the two side surfaces of the second body portion 121b, a pair of second extension portions 124b respectively extending from the pair of second wing portions 122b, and a second terrace portion 123b protruding from the front side of the second body portion 121b and connected to each of the pair of second extension portions 124b.

The second body portion 121b may be in a form of a flat plate. In one embodiment, the second body portion 121b may correspond to the internal space of the first body portion 121a, and may support the electrode assembly 110.

The pair of second wing portions 122b may correspond to the pair of first wing portions 122a. In one embodiment, each of the pair of second wing portions 122b may be curved (e.g., formed in a streamlined form or in a round form), identical or similar to the form of the pair of first wing portions 122a. In one embodiment, the pair of second wing portions 122b may bond (or be coupled) to the pair of first wing portion 122a, respectively. In one embodiment, the pair of first wing portions 122a and the pair of second wing portions 122b may be thermally bonded to each other, respectively, so as to form the pair of wing portions 122 of the pouch 120.

The second terrace portion 123b of the second pouch 120b may be identical or similarly to the first terrace portion 123a. The second terrace portion 123b may be bonded (or be coupled) to the first terrace portion 123a by thermal bonding, so that the internal space of the first body portion 121a may be sealed and isolated from the outside. In one embodiment, a first electrode tab 132 and a second electrode tab 134 may be positioned in the gap between the second terrace portion 123b and the first terrace portion 123a and may extend to the outside of the pouch 120.

The electrode assembly 110 may, for example, include a positive electrode plate coated with a positive active material, a negative electrode plate coated with a negative active material, and a separator positioned between the positive electrode plate and the negative electrode plate. In one embodiment, the positive electrode plate and the negative electrode plate are placed on top of one another (e.g., laminated on top of one another), and then rolled into a jelly-roll shape. In one embodiment, the electrode assembly 110 may include multiple combinations of the positive electrode plate, the separator, and the negative electrode plate sequentially laminated on top of one another.

The positive electrode plate may include a positive active material portion coated with a positive active material and a positive electrode non-coated portion that is not coated with a positive active material. The positive active material may be a lithium-containing transition metal oxide such as $LiCoO_2$, $LiNiO_2$, $LiMnO_2$, or $LiMnO_4$, or a lithium chalcogenide compound, but the positive active material is not limited thereto.

In one embodiment, the positive electrode plate may be an aluminum plate, and at least some portions of one surface of the aluminum plate that are coated with a positive active material may be the positive active material portion, while the residual portions of the aluminum plate that are not coated with the positive active material may be the positive electrode non-coated portion.

The negative electrode plate may include a negative active material portion coated with a negative active material and a negative electrode non-coated portion that is not coated with a negative active material. The negative active material may be a carbonaceous material such as crystalline carbon, non-crystalline carbon, carbon composite, or carbon fiber, a lithium metal, or a lithium alloy, but the negative active material is not limited thereto.

In one embodiment, the negative electrode plate may be a copper plate, and at least some portions of one surface of the copper plate that are coated with a negative active material may be the negative active material portion, and the negative electrode non-coated portion may correspond to residual portions of the copper plate that are not coated with the negative active material.

The separator may be prepared by, for example, coating any one substrate selected from a co-polymer of polyethylene (PE) substrate, a polystyrene (PS) substrate, a polypropylene (PP) and polyethylene (PE) substrate, and a polypropylene (PP) with polyvinylidene fluoride-hexafluoropropylene copolymer (PVDF-HFP co-polymer) substrate.

The first electrode tab 132 and the second electrode tab 134 may be attached to the electrode assembly 110. In one embodiment, the first electrode tab 132 and the second electrode tab 134 are respectively attached to the positive electrode non-coated portion and the negative electrode non-coated portion, and the first electrode tab 132 and the second electrode tab 134 may pass through and extend out of the pouch 120.

Figure 5:
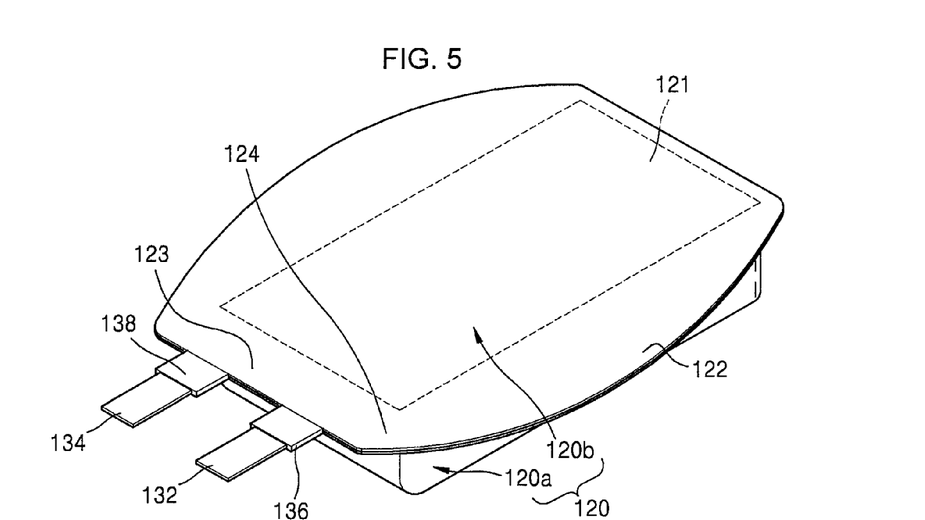
FIGS. 5 to 7 are schematic perspective views of the secondary battery in FIG. 1 during various steps of a manufacturing process.
Figure 6:
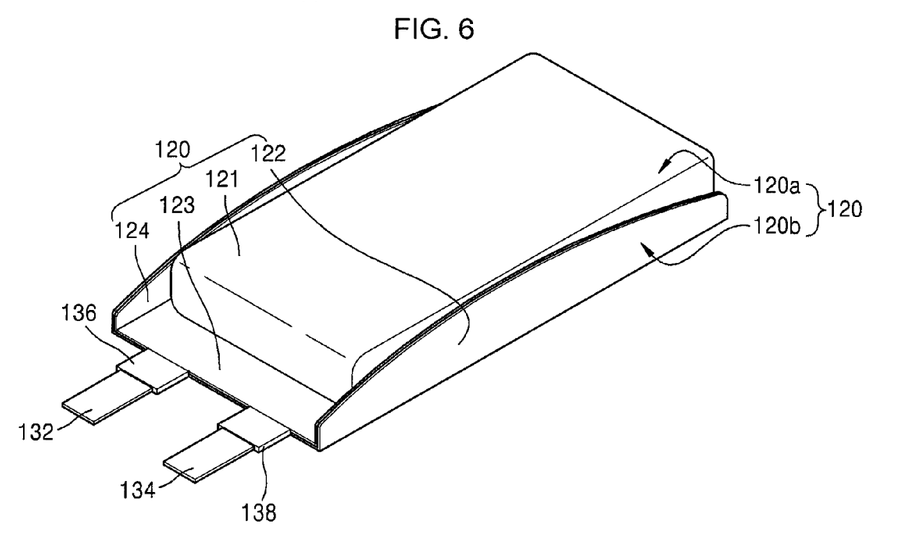
Figure 7:
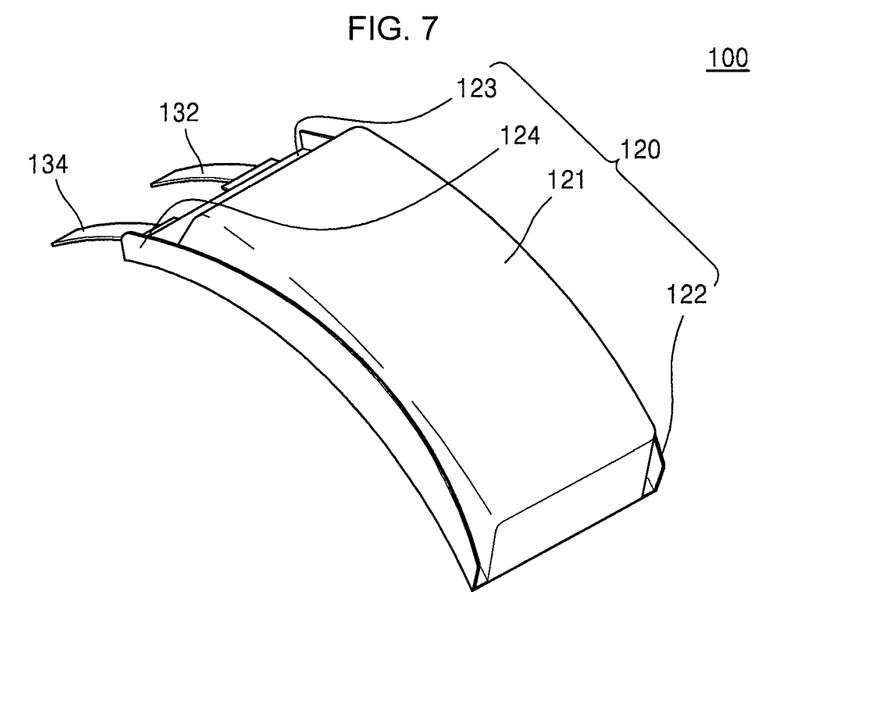

FIGS. 5 to 7 illustrate various steps of a manufacturing process of the secondary battery of FIG. 1. Hereinafter, like reference numerals above denote like elements.

Referring to FIGS. 5 to 7, the pouch 120 may be manufactured as a body from the first pouch 120a and the second pouch 120b. In one embodiment, the first pouch 120a may include the receiving space S configured to accommodate the electrode assembly 110. In one embodiment, side rims of the first pouch 120a and side rims of the second pouch 120b may be round (or curved). In one embodiment, the rims of the pair of first wing portions 122a and the rims of the pair of second wing portions 122b may each be curved (e.g. may each be in a streamlined form).

When the pouch 120 is formed as described above, the electrode assembly 110 may be inserted into the receiving space S of the first body portion 121a, and electrolyte may be injected into the receiving space S, after which the borders of the first pouch 120a and the second pouch 120b may be thermally bonded to each other (or otherwise sealed). In one embodiment, the parts of the first pouch 120a and the second pouch 120b that are in contact with each other may be formed from the same material, so as to be thermally bonded. In one embodiment, the pair of first wing portions 122a and the pair of second wing portions 122b may be respectively thermally bonded to each other to form the pair of wing portions 122. In addition, the pair of first extension portions 124a and the pair of second extension portions 124b may be respectively thermally bonded to each other to form a pair of extension portions 124.

In one embodiment, the first terrace portion 123a and the second terrace portion 123b may be thermally bonded to each other to form the terrace portion 123. When the first terrace portion 123a and the second terrace portion 123b are thermally bonded to each other, the first electrode tab 132 and the second electrode tab 134 may protrude from the electrode assembly 110 and extend out through the gap between the first terrace portion 123a and the second terrace portion 123b. In one embodiment, a first insulator 136 may be formed around a part of the first electrode tab 132 and may insulate the part of the first electrode tab 132 from the terrace portion 123a and the second terrace portion 123b. Similarly, a second insulator 138 may be formed around a part of the second electrode tab 134 and may insulate the part of the second electrode tab 134 from the first terrace portion 123a and the second terrace portion 123b.

After the above-described process is completed, the pair wing portions 122 may be bent along the sides of the electrode assembly 110. In one embodiment, the streamlined part (e.g. the curved rim) of each of the pair of wing portions 122 may be bent to extend toward the bottom surface of the receiving space S of the pouch 120. In addition, the pair of wing portions 122 may be respectively perpendicular to the bottom (or top) surface of the body portion 121, and the pair of extension portions 124 may be respectively perpendicular to the terrace portion 123.

After the pair of wing portions 122 are bent along the sides of the body portion 121, the secondary battery 100 may be placed in a jig, and the jig can be pressurized such that the secondary battery 100 may be bent to have a constant radius of curvature. In one embodiment, the secondary battery 100 may be placed in a first jig having a curved surface, and may be pressed by a second jig so as to form a curved surface corresponding to the curved surface of the first jig.

When the width of either of the pair of wing portions 122 is constant along the longitudinal direction of the wing portion 122, the edges of the wing portion 122 may collide with the jig or may be bent towards the electrode assembly 110 by the pressure applied by the jig. However, when the edges of the wing portions 122 are curved, damage to the other parts of the pouch 120, or damage to the jig, by the uncurved edges of the wing portions 122, may be prevented or reduced.

In addition, the width of each of the pair of wing portions 122 (at any point on the wing portion 122) may be smaller than the total thickness of the pouch 120, so that even when the secondary battery 100 is curved, the wing portions 122 may not extend above the surface of the pouch 120, thus preventing or reducing the damage to the other elements of the secondary battery 100.

Accordingly, when the wing portions 122 do not include sharp edges protruding above the surface of the pouch 120, damage to the pouch 120 during the process of curving of the secondary battery 100 may be prevented or reduced.

Furthermore, the curved (or streamlined) form of the wing portions 122 may prevent or reduce punctures and scratches on the pouch 120 and the jig, that may be otherwise caused by the sharp edges of the wing portions 122 during the process of curving of the secondary battery 100.

According to one or more embodiments of the present invention, a high efficiency manufacturing process for secondary batteries may be realized.

While this invention has been described with reference to exemplary embodiments, it will be understood by those skilled in the art that various changes in form and details may be made therein without departing from the spirit and scope of the invention as defined by the appended claims and equivalents thereof. Accordingly, the exemplary embodiments described therein should be considered in a descriptive sense only and not for purposes of limitation. Descriptions of features or aspects within each embodiment should typically be considered as available for other similar features or aspects in other embodiments.

What is claimed is:

1. A secondary battery comprising:
an electrode assembly;
a first pouch comprising an internal space accommodating the electrode assembly; and
a second pouch coupled to a first part of the first pouch and thermally bonded to a second part of the first pouch to seal the internal space accommodating the electrode assembly,
wherein the first pouch and the second pouch each comprise:
a body portion contacting the electrode assembly, the body portion comprising a back side, a front side opposite the back side, and two side surfaces between the back side and the front side, the body portion having a rectangular cross-section along an entire longitudinal direction of the body portion; and
a wing portion extending from each side surface of the two side surfaces of the body portion,
wherein a distance from each side surface to a rim of a respective wing portion varies along an entire longitudinal direction of the electrode assembly.

2. The secondary battery of claim 1, wherein a distance from each side surface to a central part of the rim of a respective wing portion is greater than a distance from each side surface to either end part of the rim of the respective wing portion.

3. The secondary battery of claim 2, wherein the distance from each side surface to the rim of the respective wing portion gradually decreases from the central part of the wing portion to either end of the wing portion.

4. The secondary battery of claim 1, wherein the rim of each wing portion is curved.

5. The secondary battery of claim 1, wherein each wing portion is symmetric with respect to a center of the wing portion.

6. A secondary battery comprising:
an electrode assembly comprising a first electrode tab and a second electrode tab; and
a curved pouch accommodating the electrode assembly, wherein the curved pouch comprises:
a body portion accommodating the electrode assembly, the body portion comprising a back side, a front side opposite the back side, and two side surfaces between the back side and the front side, the body portion having a rectangular cross-section along an entire longitudinal direction of the body portion;
a wing portion extending from each side surface of the two side surfaces of the body portion and bent toward the respective side of the body portion accommodating the electrode assembly, wherein a distance from each side surface to a rim of a respective wing portion varies along an entire longitudinal direction of the electrode assembly; and
a terrace portion extending from the front side of the body portion, the terrace portion, the wing portions and the back side of the body portion together enclosing an internal space of the body portion, wherein the first electrode tab and the second electrode tab extend to the outside of the curved pouch.

7. The secondary battery of claim 6, wherein a distance from each side surface to a central part of the rim of the respective wing portion is greater than a distance from each side surface to either end part of the rim of the respective wing portion.

8. The secondary battery of claim 7, wherein the distance from each side surface to the rim of the respective wing portion gradually decreases from the central part of the wing portion to either end of the wing portion.

9. The secondary battery of claim 6, wherein each wing portion is symmetric with respect to a center of the wing portion.

10. The secondary battery of claim 6, wherein each wing portion is bent perpendicular to the terrace portion and comprises an extension portion continuously extending from the wing portion toward the terrace portion.

\* \* \* \* \*